(12) United States Patent
Alvarez et al.

(10) Patent No.: US 12,003,805 B2
(45) Date of Patent: Jun. 4, 2024

(54) RESUMING PLAYBACK ON MULTIPLE STREAMING DEVICES

(71) Applicant: ROKU, INC., San Jose, CA (US)

(72) Inventors: Javier Alvarez, Austin, TX (US); Robert Van Gulick, Austin, TX (US); Nicolas Hewitt, Austin, TX (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/204,154

(22) Filed: May 31, 2023

(65) Prior Publication Data

US 2023/0308707 A1    Sep. 28, 2023

Related U.S. Application Data

(63) Continuation of application No. 17/389,568, filed on Jul. 30, 2021, now Pat. No. 11,716,498.

(51) Int. Cl.
*H04N 21/43* (2011.01)
*G06F 1/3206* (2019.01)
*H04N 21/41* (2011.01)
*H04N 21/422* (2011.01)
*H04N 21/443* (2011.01)
*H04N 21/6587* (2011.01)

(52) U.S. Cl.
CPC ..... *H04N 21/43078* (2020.08); *G06F 1/3206* (2013.01); *H04N 21/4126* (2013.01); *H04N 21/42204* (2013.01); *H04N 21/4436* (2013.01); *H04N 21/6587* (2013.01)

(58) Field of Classification Search
None
See application file for complete search history.

(56) References Cited

U.S. PATENT DOCUMENTS

| 2009/0232481 A1 | 9/2009 | Baalbergen et al. |
| 2017/0325275 A1 | 11/2017 | Tonsgard et al. |
| 2023/0036682 A1 | 2/2023 | Alvarez et al. |

*Primary Examiner* — Samira Monshi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for transferring streaming media playback between streaming media devices. In an example embodiment, a user may be streaming content using a first media device. The user may then send a command to the first media device to transfer the streaming content to a second media device. The first media device may identify the second media device as being on a common network and transmit a wake command to the second media device as well as media playback state information indicating a playback position to resume playback. In some embodiments, the first media device may download the media playback state information onto a mobile device. The mobile device may then provide the media playback state information to the second media device to resume playback at the first media device's playback position.

20 Claims, 8 Drawing Sheets

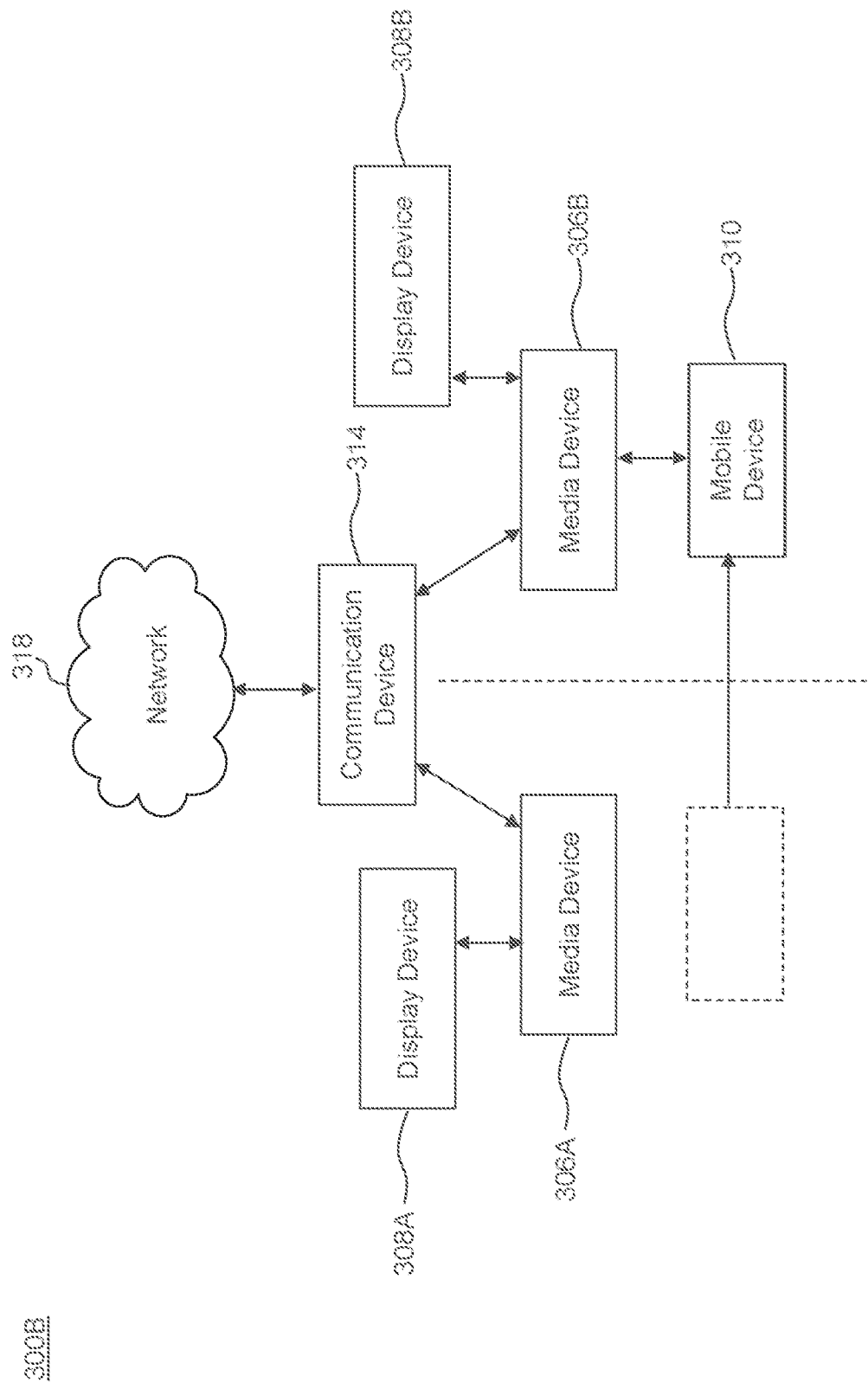

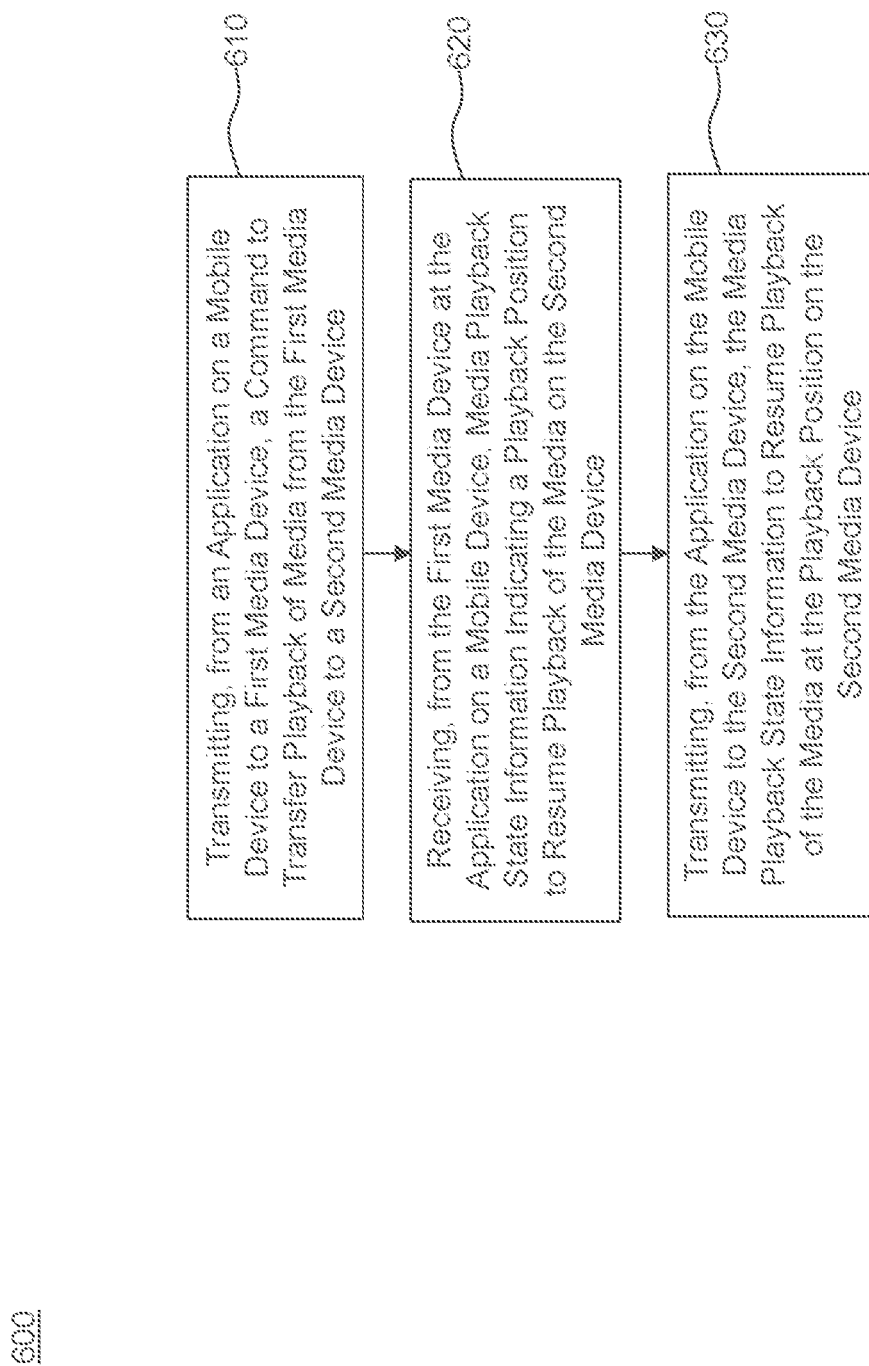

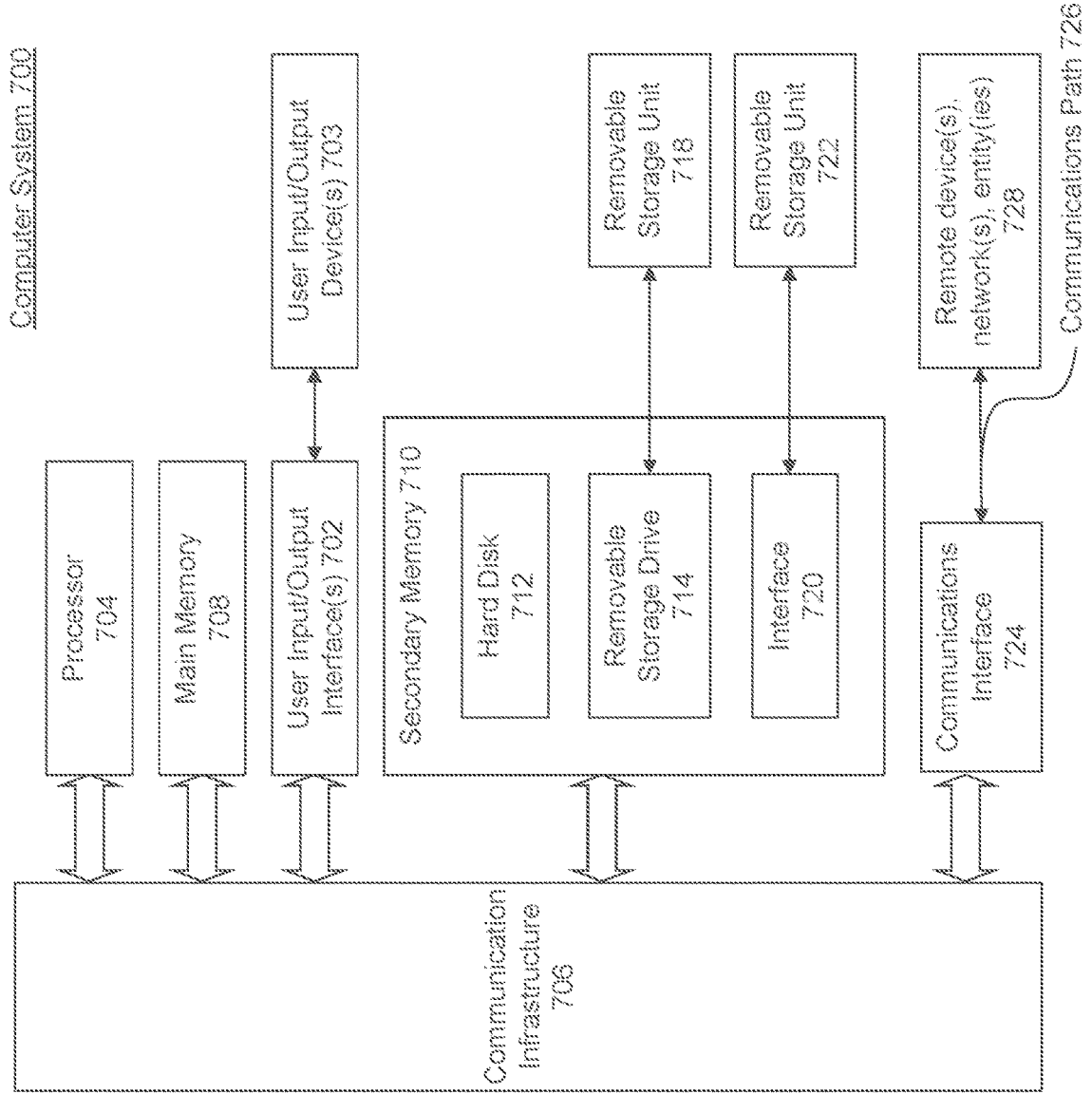

RESUMING PLAYBACK ON MULTIPLE STREAMING DEVICES

CROSS-REFERENCE TO RELATED APPLICATIONS

This application is a continuation of U.S. patent application Ser. No. 17/389,568, filed Jul. 30, 2021, the entirety of which is incorporated herein by reference.

BACKGROUND

Field

This disclosure is generally directed to streaming media, and more particularly to the transfer of playback between multiple streaming devices.

Background

Consumers commonly stream media such as a movie or TV show in their homes.

When streaming this media, consumers may switch rooms or use a different device to consume the streaming media. For example, while streaming a movie in a living room, the consumer may wish to move to a bedroom and continue to stream the movie in this new space. When changing rooms, however, the user may face the cumbersome task of setting up the stream at the new location to the playback position of the previous location. In such cases, the user may potentially waste time selecting the streaming channel, identifying streaming media within the channel, and then identifying the previous playback position. Further, the user may face difficulties when trying to accurately identify the playback position.

SUMMARY

Provided herein are system, apparatus, article of manufacture, method and/or computer program product embodiments, and/or combinations and sub-combinations thereof, for transferring streaming media playback between streaming media devices.

In some embodiments, a user may be streaming media in a first room using a first media device. For example, the user may be viewing a movie or TV show on a display device via a streaming media device. The user may then wish to change to a second room or use a second media device to continue streaming the media. The user, however, may wish to resume the playback of the streaming media at the same position when using the second media device without the burden of locating the channel, the streaming content, and the playback position again.

To resume playback of content while avoiding these burdens, an example embodiment operates by a first media device communicating with a second media device. The first and second media devices may share a common network, such as a home network or WiFi network. A user may view content using the first media device. The user may supply a command to the first media device indicating a transfer of playback to the second media device. This command may be provided by a selection on a menu displayed by the first media device on a display device. In some embodiments, the menu may be displayed on a remote control or a mobile device. The user may provide a menu selection using the remote control and/or the mobile device. In some embodiments, the user may provide a voice command to transfer the playback. The user may specify the second media device and/or may generally indicate that playback is to be transferred.

Upon receiving a command to transfer the playback, the first media device may transmit a command to wake the second media device indicating that the second media device is to resume playback of the streaming media. This command may be directly sent to the second media device via the common network. In some embodiments, the command may place the second media device in a standby mode to further be powered on by a remote control and/or a mobile device interacting with the second media device.

The first media device may also transmit media playback state information to the second media device. This information may include a playback position to resume playback of the media on the second media device. This information may also include a channel and/or content identifier informing the second media device of how to retrieve the previously played content. Using this information, the second media device may identify a content provider from a plurality of content providers as well as the particular content supplied by that content provider. Using the playback position information received from the first media device, the second media device may resume the playback of the content that the user was previously viewing.

In some embodiments, the first media device may periodically broadcast data and/or metadata corresponding to a stream to the second media device and/or other media devices sharing a common network. The data may include a channel identification, content identification, and/or position information. The first media device may provide this data in the background without user input. The first media device may provide this information via a network such as a via a WiFi connection. The second media device and/or other media devices may listen for broadcast messages from the first media device. The second media device and/or other media devices may store the media playback state information locally. When the user picks up a remote control that is paired to the second media device, the second media device may prompt the user to provide a resume command. For example, the second media device may wake and/or provide a display on a display device with this prompt. The user may provide the resume command via a remote control and/or a mobile device. When the user confirms the resume, the second media device may resume playback using the media playback state information received from the first media device. The second media device may also transmit a command to the first media device which terminates the stream on the first media device. The second media device may also turn off a display device such as a TV coupled to the first media device.

In some embodiments, rather than transmitting the media playback state information to the second media device, the first media device may download the media playback state information to an application stored on a mobile device, such as a smartphone, tablet, or remote control. For example, the mobile device may transmit a command to the first media device to transfer playback. The first media device may then transmit the media playback state information indicating a playback position to the mobile device. The mobile device may then transmit the media playback state information to the second media device to resume playback. In some embodiments, the user may supply a command to the mobile device to select the desired second media device. The media playback state information may include a channel identification, content identification, and/or playback position information. Using this information, the second media device may identify the particular content server and/or content to retrieve the content to stream. The second media device may also identify the same playback position identified by the first media device.

In some embodiments, the first media device may store playback position on a system server. This system server may reside in a different location from the first and second media devices and may be accessed via the Internet or WAN. The system server may track profile information and/or playback positions corresponding to content viewed by a user. In this case, when the user uses the second media device, the second media device may communicate with the system server to receive the playback position information and/or other media playback state information.

BRIEF DESCRIPTION OF THE FIGURES

The accompanying drawings are incorporated herein and form a part of the specification.

FIG. 3B illustrates a block diagram of a multimedia environment for changing streaming playback from a first media device to a second media device via a mobile device, according to some embodiments.

FIG. 6 illustrates a flowchart depicting a method for transferring media playback from a first media device to a second media device via a mobile device application, according to some embodiments.

FIG. 7 illustrates an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for transferring streaming media playback between streaming media devices.

Figure 1:
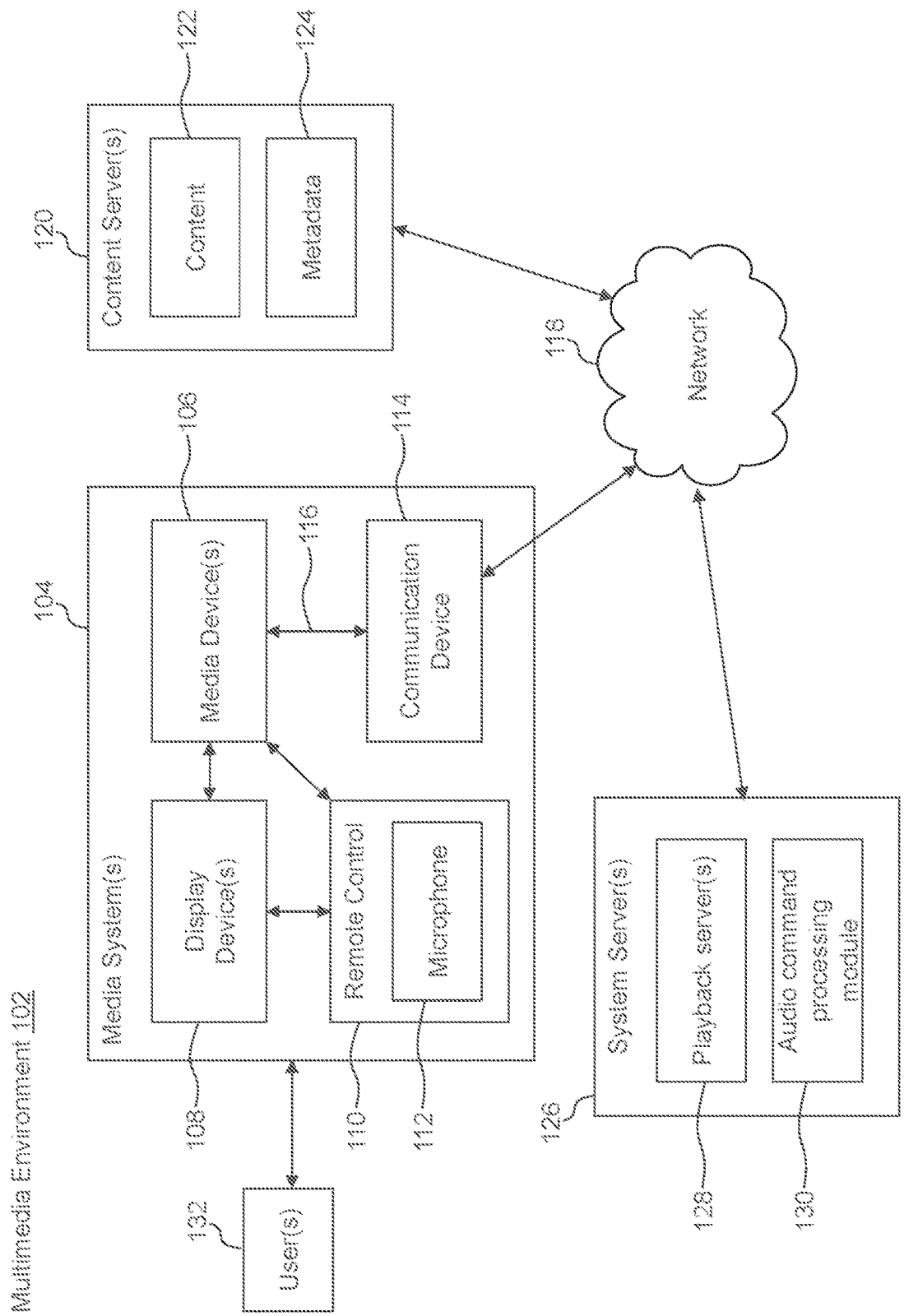
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content. In some embodiments, multimedia environment 102 may be a home with multiple media systems 104 in the same or different rooms.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections. Communication device 114 may provide a wireless and/or wired connection between multiple media devices 106, such that the media devices 106 share a common network. This common network may be, for example, a private, public, and/or home network.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels, or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content servers 120 may be identified by channel identifications or channel IDs.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

System servers 126 may include one or more playback servers 128. Playback servers 128 may manage login credentials and/or profile information corresponding to media systems 104 and/or media devices 106. The profile information may include names, usernames, and/or data corresponding to the content or media viewed by users 132. The profile information may also track media playback positions corresponding to different media streamed by media devices 106. For example, playback servers 128 may track content 122 and/or metadata 124 streamed to media devices 106. Playback servers 128 may associate content 122 playback positions with profile information. In this manner, when a user 132 accesses different media systems 104, content 122 playback positions may be communicated to different media devices 106. In this manner, the user 132 may resume playback of content 122 at the previous playback position even when the user 132 moves between different media systems 104 and/or uses different media devices 106.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108. As will be further explained below, user 132 may supply a verbal command to transfer playback of content 122 from one media device 106 to another media device 106. In some embodiments, the verbal command may transfer playback to another media system 104. For example, the user 132 may supply a command indicating that playback should be transferred. The user may additionally specify a destination media device 106 and/or media system 104 to transfer the stream of content 122.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
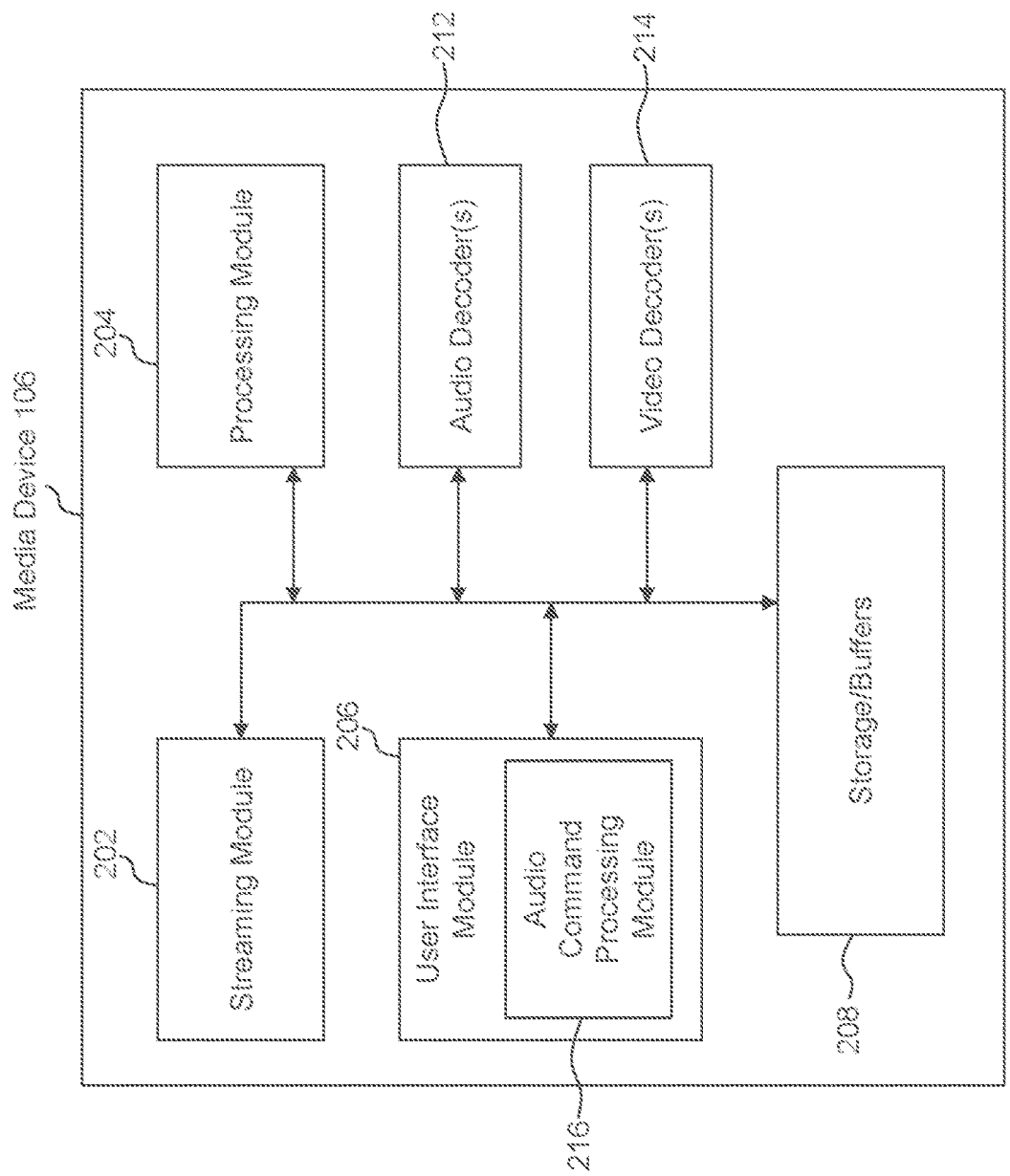
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216. The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110 and/or a mobile device. For example, the user 132 may use the remote control 110 and/or mobile device to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

As previously explained above, remote control 110 and/or a mobile device may also supply a command to media device 106 via user interface module 206 to transfer playback of content 122 to another media device 106 and/or media system 104. This command may be provided via menu selections displayed on remote control 110 and/or the mobile device. In some embodiments, media device 106 may display a menu on display device 108 via streaming module 202. The menus may allow a user 132 to specify that streaming media is to be transfer to another media device 106. The user 132 may also indicate the particular media device 106 that will resume playback of the streaming media. The user may also supply an audio command to transfer the playback of the streaming media.

Transferring Playback to Another Media Device or Media System

Within multimedia environment 102, streaming media playback may be transferred between streaming media devices 106 and/or media systems 104. FIGS. 3A, 3B, 4, 5, and 6 further describe processes for transferring and/or resuming playback on different streaming media devices 106.

Figure 3A:
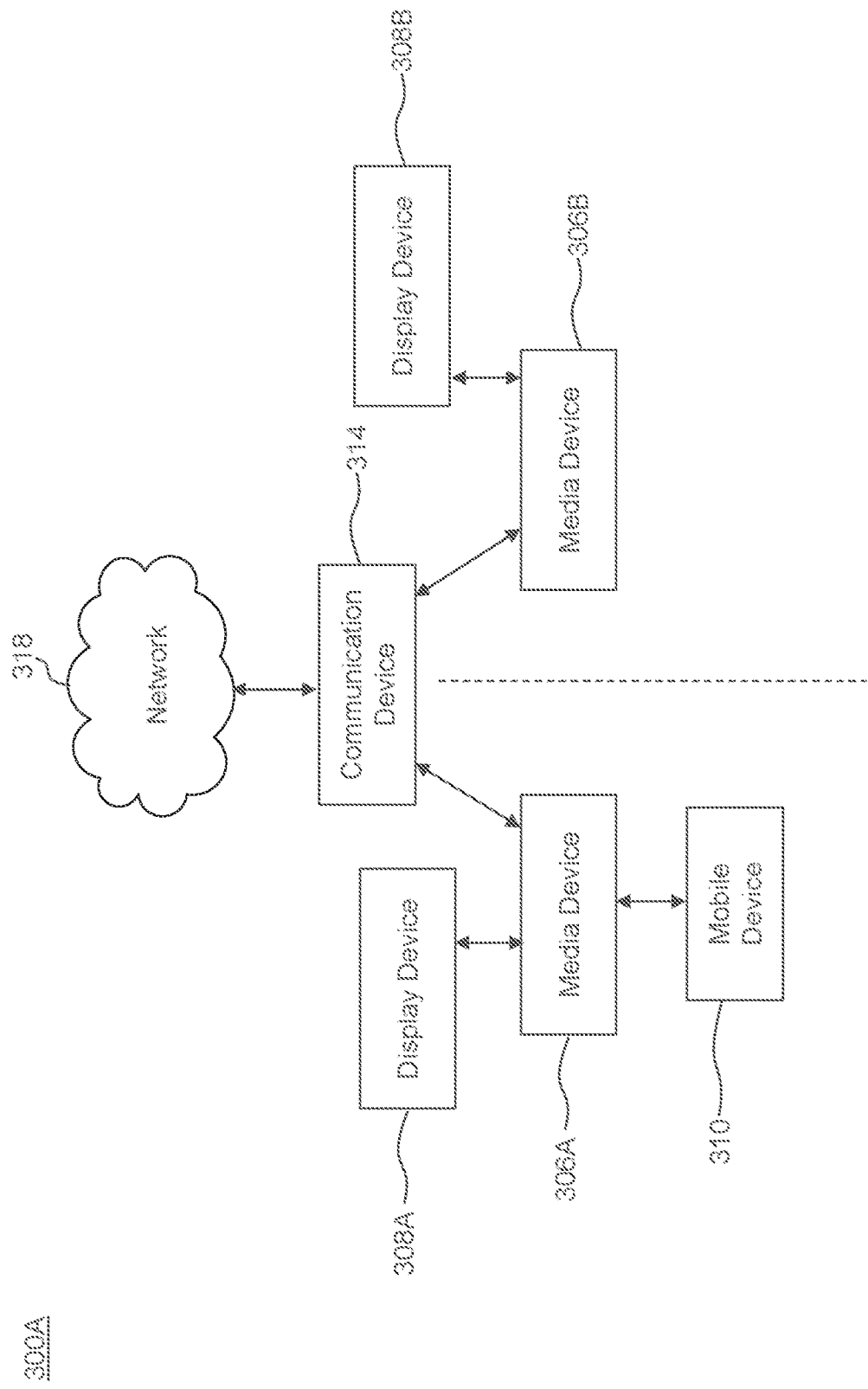
FIG. 3A illustrates a block diagram of a multimedia environment for changing streaming playback from a first media device to a second media device, according to some embodiments.

FIG. 3A illustrates a block diagram of a multimedia environment 300A for changing streaming playback from a first media device 306A to a second media device 306B, according to some embodiments. First and second media devices 306A, 306B may operate in a similar manner to media device 106 as described with reference to FIGS. 1 and 2. In some embodiments, first and second media devices 306A, 306B may be located in different media systems 104. For example, first and second media devices 306A, 306B may be located in different rooms in a house. First and second media devices 306A, 306B may be connected to display devices 308A, 308B respectively. Display devices 308A, 308B may operate in a manner similar to display device 108 as described with reference to FIG. 1.

First and second media devices 306A, 306B may communicate with communication device 314. Communication device 314 may operate in a similar manner to communication device 114 as described with reference to FIG. 1. Communication device 314 may communicate with network 318. Network 318 may operate in a similar manner to network 118 as described with reference to FIG. 1. In some embodiments, communication device 314 and/or network 318 may provide a common shared network for first and second media devices 306A, 306B. For example, this may be a home network and/or a private network. Communication device 314 may connect first and second media devices 306A, 306B to external networks, public networks, and/or the Internet via network 318. For example, network 318 may communicate with one or more system servers and/or content servers. First and second media devices 306A, 306B may retrieve streaming media content from one or more content servers for playback on display devices 308A, 308B respectively. In at least one embodiment, the communication device 314 is virtual server instance from a public or private cloud network. In an embodiment the communication device 314 is a resource shared peer-to-peer between media devices 306 and/or mobile devices.

Multimedia environment 300A may also include mobile device 310. Mobile device 310 may operate in a similar manner as remote control 110 as described with reference to FIG. 1. In some embodiments, mobile device 310 may be a smartphone, tablet, and/or remote control configured to communicate with a media device 306. Mobile device 310 may have an installed application configured to provide commands to a media device 306. For example, mobile device 310 may be used to select a particular content channel for streaming content and/or content from the channel to stream. Mobile device 310 may transmit such commands to a media device 306 to retrieve the desired content. In some embodiments, a user may navigate one or more menus displayed on display device 308A and/or a screen on mobile device 310 to provide a selection. These menus may be graphical user interfaces. Mobile device 310 and/or media device 306 may also include a microphone for a user to provide a verbal command to provide a selection.

Via a selection using mobile device 310 and/or media device 306A, a user may indicate a desire to transfer playback of streaming media to media device 306B. For example, a user may be streaming media in a first room using first media device 306A. The user may be viewing a movie or TV show on display device 308A via media device 306A. The user may then wish to change to a second room or use second media device 306B with display device 308B to continue streaming the media. The user, however, may wish to resume the playback of the streaming media at the same position when using the second media device 306B without the burden of locating the channel, the streaming content, and/or the playback position again.

To resume playback of content while avoiding these burdens, first media device 306A may communicate with second media device 306B. For example, first media device 306A may transmit a command via communication device 314 to second media device 306B. This command may be a data packet transmitted over a common network such as a home network. For example, first and second media devices 306A, 306B may communicate via a WiFi connection provided by a router and/or modem.

Using mobile device 310 and/or a verbal command received via media device 306A, the user may supply a command to media device 306A indicating a transfer of playback to second media device 306B. This command may be provided by a selection on a menu displayed by first media device 306A on display device 308A. For example, the menu presented may list one or more media device 306 connected to the same communication device 314 and/or network 318 as media device 306. The user may then provide a selection of the particular media device 306 to resume playback.

In some embodiments, the selection may be a general selection indicating that playback will be resumed on another media device 306. In this case, media device 306A may transmit a standby command to other media devices 306 on the network 318. This command may preset the other media devices 306 to resume playback at the playback position where the user stopped on media device 306A. The user may then wake the desired media device 306 at the location where the user desires to continue watching. This waking may be performed by mobile device 310 and/or a remote control configured to control the desired media device 306B. For example, when the user turns on or powers the desired media device 306B, the media device 306B may already be preconfigured to resume playback of the content upon powering on. In some embodiments, a remote control may include an accelerometer and/or a gyroscope used to provide commands to a media device 306. When the user picks up the remote control, the remote control may detect a signal generated by these components and issue a power on command in response. Movement of the remote control may be detected. The remote control may then transmit this power on command to the desired media device 306B. In this manner, when the user picks up the remote control, the desired media device 306B may be awoken and may resume playback at the previous playback position. Media device 306B may monitor for wake events provided by media device 306A, mobile device 310, and/or a remote control. Media device 306B may also awaken display device 308B using, for example, an HDMI CEC command. This awakening process may also occur when the user has provided a selection of a specific media device 306B to transfer playback.

In some embodiments, media device 306B may resume playback after a set delay time. For example, the user may identify a particular media device 306B causing media device 306A to transmit a wake command and/or playback information to the selected media device 306B. Media device 306B may then awaken and/or wake display device 308B. After a preset delay, media device 306B may then resume playback using playback information provided by media device 306A. This preset delay may allow the user time to move from the first location to the second location. In some embodiments, media device 306B may automatically power on and wait for a subsequent command from the user to begin playback.

Media device 306B may also be configured to remain in a powered off state or sleep mode until the user wakes media device 306B. When this occurs, media device 306B may exchange messages with media device 306A to receive the media playback state information to resume playback. As will be further explained below, media device 306B may receive the media playback state information from media device 306A and/or mobile device 310. The user may wake media device 306B with mobile device 310 and/or a remote control.

To resume playback, media device 306B may receive media playback state information from media device 306A. This media playback state information may include a channel identification; content identification; and/or playback position to resume playback of the media. Media device 306B may use the channel identification and/or content identification to identify the particular content previously viewed on media device 306A. For example, media devices 306 may receive content from different content servers. These content servers may be identified using a channel identification. The content servers may be different third party content providers. For example, the different content providers may provide different movies and/or TV shows. Using the channel identification, media devices 306 may identify the relevant content servers to retrieve desired content. Media devices 306 may also handle log in credentials used to access content from third party content providers. These log in credentials may be specific to the content providers and may differ from those used to access media devices 306. In some embodiments, a media device 306 may use an API to indicate a start at a particular location. In some embodiments, a media device 306 may pass the content identification and/or the playback position to a content provider to begin the playback at the specified position.

Additionally, media devices 306 may use a content identification to identify particular content from the content servers. The content identification may identify a movie, episode of a TV show, and/or other streaming media content. Media device 306B may use the channel identification and/or content identification to identify the content previously being streamed on media device 306A.

Media device 306A may also transmit the playback position corresponding to the content to media device 306B. The playback position may include a timestamp and/or an indication of a timing position corresponding to the streaming content. For example, media device 306A may record a timing position when the user indicates that the playback is to be transferred to another media device 306B. In some embodiments, the playback position may indicate a timing for a video and/or audio source for the streaming media. By including this playback position with the channel identification and/or content identification, media device 306B may identify the specific channel, content, and playback position to resume playback. As will be further explained below, media device 306B may receive the playback position from media device 306A and/or mobile device 310.

In some embodiments, media device 306A may store playback position on a system server. This system server may reside in a different location from the first and second media devices 306A, 306B and may be accessed via the Internet or WAN. The system server may track profile information and/or playback positions corresponding to content viewed by a user. In this case, when the user uses the second media device 306B, the second media device 306B may communicate with the system server to receive the playback position information and/or other media playback state information While two media devices 306A, 306B are displayed, additional media devices 306 may also be connected via communication device 314. A user may select a particular media device 306 to transfer playback. In some embodiments, a user may provide a selection to broadcast the playback onto multiple media devices 306. In this case, the multiple media devices 306 may receive the media playback state information from media device 306A. The multiple media devices 306 may then play the content simultaneously.

In some embodiments, media device 306A may periodically broadcast data and/or metadata corresponding to a stream to media device 306B and/or other media devices 306 sharing a common network 318 and/or connected to communication device 314. The data may be media playback state information and/or may include a channel identification, content identification, and/or position information. Media device 306A may provide this data in the background without user input. Media device 306A may provide this information via network 318 and/or communication device 314. For example, media device 306A may transmit media playback state information via a WiFi connection. Media device 306B and/or other media devices 306 may listen for broadcast messages from media device 306A. Media device 306B and/or other media devices 306 may store the media playback state information locally. When the user picks up a remote control that is paired to media device 306B, media device 306B may prompt the user to provide a resume command. Media device 306B may detect when the user has picked up the remote control and enter a wake state. Media device 306B may then provide the prompt. For example, media device 306B may wake and/or provide a display on display device 308B with this prompt. The user may provide the resume command via a remote control and/or a mobile device 310. When the user confirms the resume, media device 308B may resume playback using the media playback state information received from media device 308A. Media device 308B may also transmit a command to media device 308B which terminates the stream on media device 308A. Media device 308B may also turn off display device 308A such as a TV coupled to media device 306A.

FIG. 3B illustrates a block diagram of a multimedia environment 300B for changing streaming playback from a first media device 306A to a second media device 306B via a mobile device 310, according to some embodiments. FIG.

3B depicts a process of transferring playback by storing media playback state information on mobile device 310. For example, while interacting with media device 306A, a user may use an application on mobile device 310 to indicate that playback should be transferred to another media device 306. Media device 306A may then download the media playback state information to the mobile device 310. The user may then transmit this media playback state information to another media device 306B to resume playback of the content at the playback position previously identified by media device 306A. The components of multimedia environment 300B may be similar to those described with reference to FIG. 3A.

In some embodiments, rather than media device 306A transmitting the media playback state information to media device 306B, media device 306A may download the media playback state information to an application stored on mobile device 310. As previously explained, mobile device 310 may be a smartphone, tablet, or remote control. The media playback state information may include a channel identification, content identification, and/or playback position information. To initiate the download, mobile device 310 may transmit a command to media device 306A to transfer playback. For example, the user may use mobile device 310 to provide a menu selection and/or a verbal command. The menu selection may be applied via a graphical user interface displayed on mobile device 310 and/or on display device 308A by media device 306A. The menu selection may specifically identify media device 306B and/or may generally indicate that playback is to be transferred. For example, the command to transfer playback of the media may be non-specific to media device 306B. Rather, the command may be a general command and the user may later identify media device 306B using mobile device 310 when the user wishes to transmit the media playback state information.

Upon receiving a command to transfer playback, media device 306A may then transmit the media playback state information indicating a playback position to mobile device 310. For example, media device 306A may perform a snapshot memory of a particular channel and/or use a feature in a Linux kernel to preserve the playback position. Mobile device 310 may store this media playback state information in memory. The user may then bring mobile device 310 to another room with media device 306B. Mobile device 310 may then transmit the media playback state information to media device 306B to resume playback. The media playback state information may include a channel identification, content identification, and/or playback position information. Using this information, media device 306B may identify the particular content server and/or content to retrieve the content to stream. Media device 306B may also identify the same playback position identified by media device 306A. This may occur in a manner similar to that described with reference to FIG. 3A.

In some embodiments, mobile device 310 may be a remote control corresponding to media device 306A. Media device 306A may transmit the media playback state information to the remote control. The remote control may then transmit this media playback state information to media device 306B. This may allow the remote control to provide a command to media device 306B even when media device 306B has its own corresponding remote control. This may be used when the remote control is in close proximity to both media devices 306A and 306B.

Figure 4:
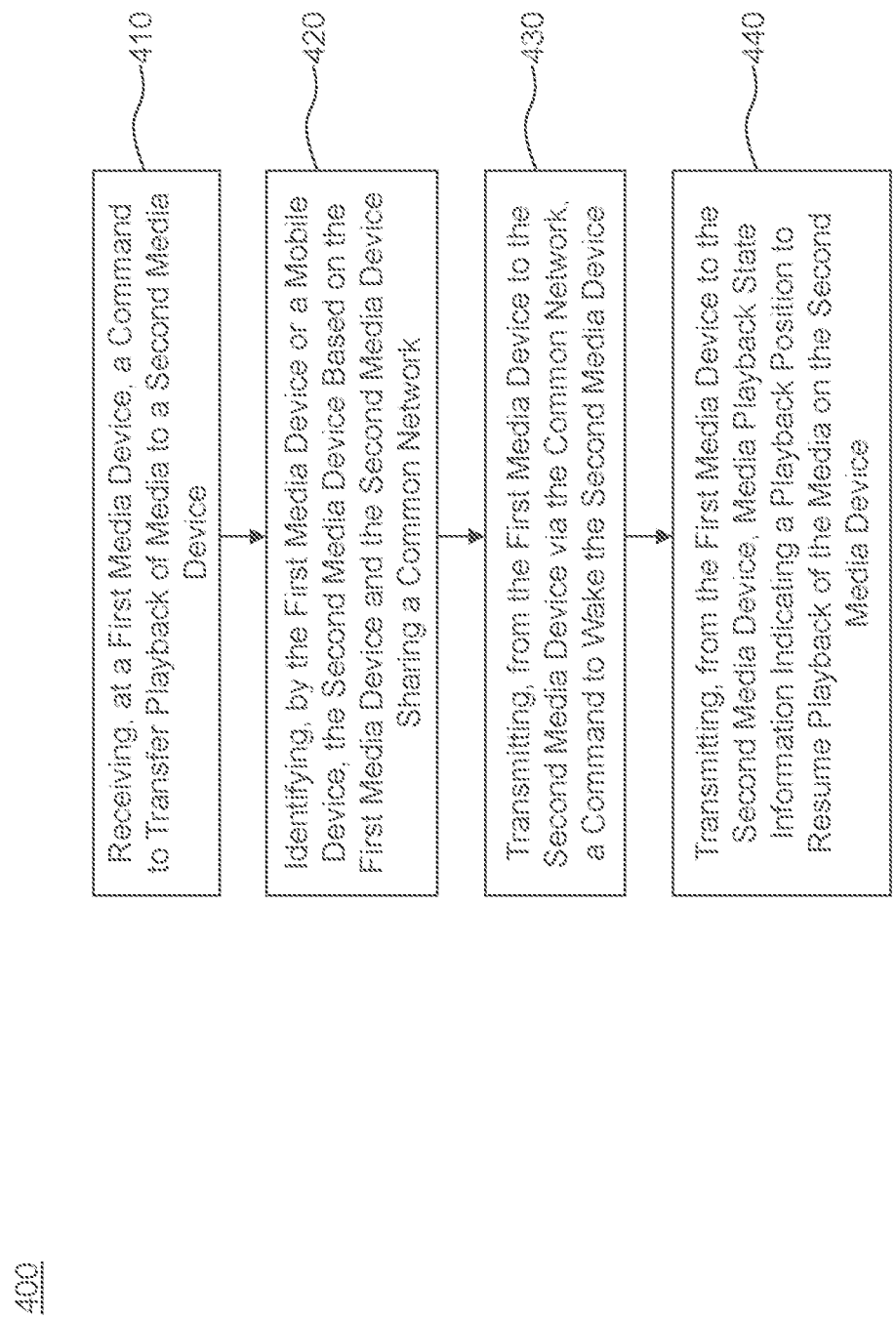
FIG. 4 illustrates a flowchart depicting a method for transferring media playback from a first media device to a second media device, according to some embodiments.

FIG. 4 illustrates a flowchart depicting a method 400 for transferring media playback from a first media device to a second media device, according to some embodiments. Method 400 shall be described with reference to FIG. 1, FIG. 2, and FIG. 3A; however, method 400 is not limited to that example embodiment.

In an embodiment, a first media device 306A may transfer playback of streaming media content to a second media device 306B. Method 400 may provide a process for transferring playback while resuming playback at the playback position where streaming is stopped at the first media device 306A. While method 400 is described with reference to first media device 306A, method 400 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 410, first media device 306A may receive a command to transfer playback of media to a second media device 306B. A user may supply this command to first media device 306A via a mobile device 310 and/or a remote control. For example, a graphical user interface menu may be displayed on mobile device 310 and/or on display device 308A allowing a user to provide a selection to transfer playback. In some embodiments, the command may be received via a verbal command. The selection may specify second media device 306B and/or may generally indicate that playback is to be transferred to another media device 306. Based on receiving the command, first media device 306A may cease playback and generating a packet or message including media playback state information. This media playback state information may include a playback position, channel identification, and/or content identification.

At 420, first media device 306A may identify the second media device 306B based on the first media device 306A and the second media device 306B sharing a common network. As will be further described below, mobile device 310 may identify second media device 306B. In some embodiments, the common network may be provided by communication device 314. Media devices connected to communication device 314 may be connected to the common network. First media device 306A may identify second media device 306B based on a user selection of second media device 306B. For example, first media device 306A may detect the media devices 306 connected to the common network and may provide these media devices 306 as a selection for the user. The user may then select second media device 306B from a menu provided by first media device 306A.

In some embodiments, first media device 306A may identify second media device 306B by scanning the network after a user has provided a command to transfer playback. For example, the user may generally indicate that playback is to be transferred to another media device 306 on the common network. The user, however, may not identify a specific media device 306. Rather, the user may approach a desired media device 306 and interact with that media device 306. This interaction may then indicated the desired media device 306. In this case, at 420, first media device 306A may identify the media devices 306 on the common network to preset them to resume playback when the user approaches the desired media device 306.

In some embodiments, mobile device 310 may identify second media device 306B. For example, mobile device 310 may communicate with first media device 306A to identify second media device 306B for first media device 306A. Mobile device 310 may identify second media device 306B as sharing a common network with mobile device 310. Mobile device 310 may display a list and/or menu including second media device 306B. A user using mobile device 310 may select second media device 306B from the menu.

At 430, the first media device 306A may transmit, to the second media device 306B via the common network, a command to wake the second media device 306B. First media device 306A may send a message over the common network to communicate with second media device 306B. This command may turn on or power on the second media device 306B. Second media device 306B may also power on a corresponding display device 308B. In some embodiments, this command may place second media device 306B in a standby mode. For example, this standby mode may place second media device 306B in a state to be woken up by mobile device 310 and/or a corresponding remote. This standby mode may allow second media device 306B to preload the streaming content as well as the playback position while waiting for the user to interact with second media device 306B.

At 440, the first media device 306A may transmit to the second media device 306B media playback state information indicating a playback position to resume playback of the media on the second media device 306B. The media playback state information may also include a channel identification and/or content identification. Using the media playback state information, the second media device 306B may retrieve the content from a content server. For example, the second media device 306B may identify a third party content provider to retrieve the content previously being viewed via first media device 306A. Using this information, second media device 306B may preload the content as well as the playback position for the user to resume playback using second media device 306B.

For example, second media device 306B may retrieve and buffer the content with a preset delay allowing the user to enter the room with the second media device 306B. In some embodiments, second media device 306B may preload the content at the playback position and wait for a command from mobile device 310 and/or a remote control before resuming playback. For example, second media device 306B may remain in standby mode with content preloaded until a user interacts with mobile device 310 and/or the corresponding remote control. This situation may occur when a second media device 306B has not been identified by the user, and first media device 306A may be preparing each of the media devices 306 on the common network to resume playback.

In this manner, first media device 306A may transmit media playback state information to second media device 306B to resume playback. After transmitting this playback information, first media device 306A may enter a sleep mode, power off, and/or power off a corresponding display device 308A. For example, if first media device 306A is connected to display device 306B via an HDMI connection, first media device 306A may transmit an HDMI CEC command and/or stop sending a video signal.

Figure 5:
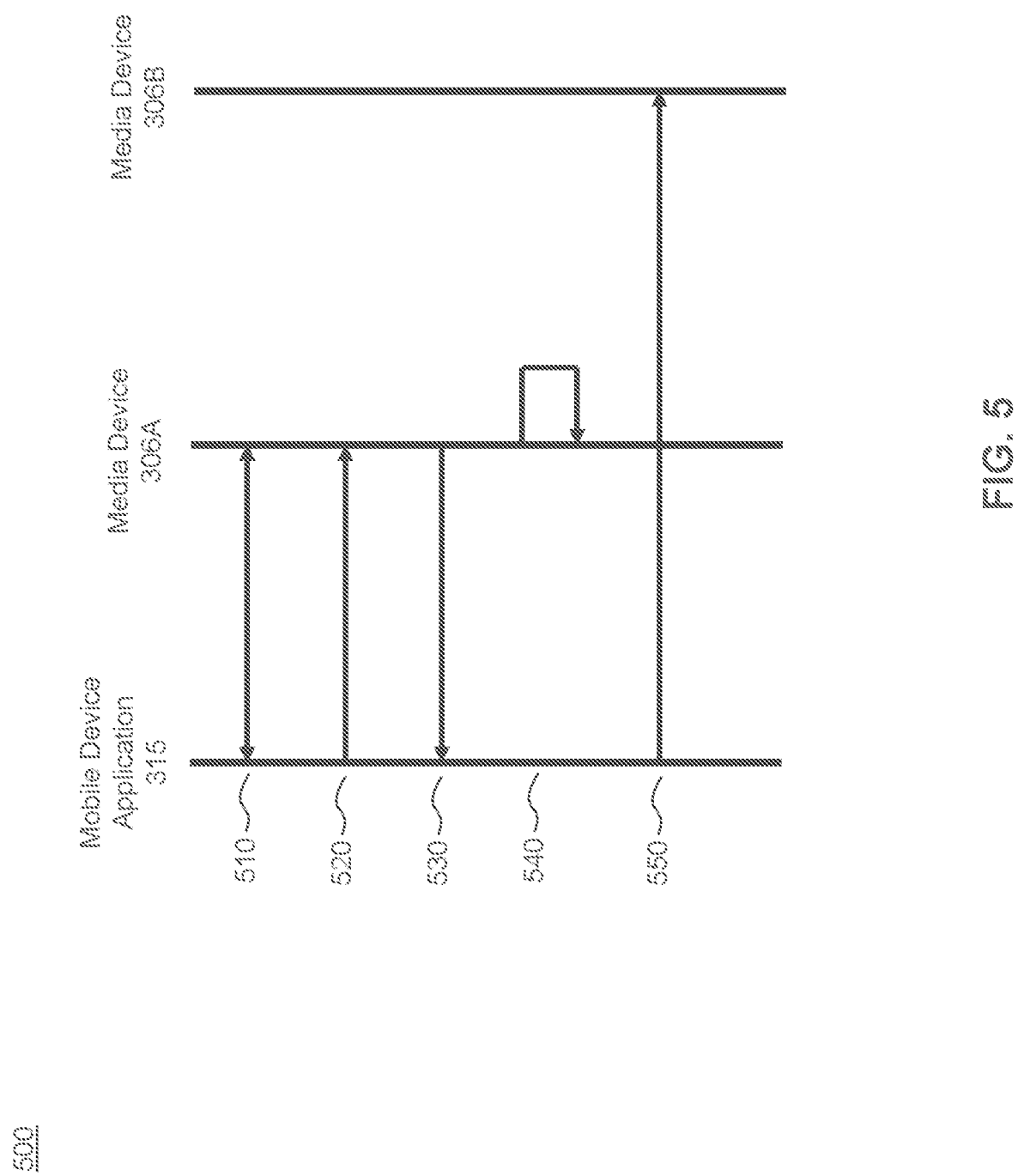
FIG. 5 illustrates interactions between a mobile device application, a first media device, and a second media device to transfer media playback via the mobile device application, according to some embodiments.

FIG. 5 illustrates interactions 500 (that is, signals) between a mobile device application 315, a first media device 306A, and a second media device 306B to transfer media playback via the mobile device application 315, according to some embodiments. Interactions 500 may occur in a manner similar to that described with reference to FIG. 3B. In this case, playback may be transferred from first media device 306A to second media device 306B by downloading media playback state information to mobile device application 315. Mobile device application 315 may be an application installed on mobile device 310.

At 510, mobile device application 315 may be interacting with media device 306A. For example, mobile device application 315 may be used to identify particular content to stream on media device 306A. This content may be identified using one or more graphical user interfaces, which may include menus and/or search boxes. In some embodiments, this interaction may occur via verbal commands.

At 520, while streaming content, mobile device application 315 may be used to indicate that playback is to be transferred to another media device 306. This indication may be a selection within mobile device application 315. In some embodiments, this selection may identify the particular media device 306 which will resume playback. In some embodiments, this selection may be a general indication of transfer without specifying a particular media device 306. Mobile device application 315 may provide this indication via a selection on a graphical user interface displayed on mobile device application 315 and/or on display device 308A. In some embodiments, a remote control other than mobile device 310 may provide this indication. The media playback state information may still be downloaded onto mobile device application 315.

At 530, media device 306A may download the media playback state information onto mobile device application 315. For example, media device 306A may pause the currently streaming content and identify a playback position. Media device 306A may then download this playback position to mobile device application 315. This downloading may occur via a wireless connection. For example, if mobile device 310 is connected to the same network as media device 306A, media device 306A may transmit a message over the network to download the media playback state information onto mobile device application 315. In some embodiments, media device 306A may transmit a message directly to mobile device 310 using an agreed upon wireless communication protocol. This protocol may not rely on the network to transmit the media playback state information. As previously explained, the media playback state information may include a channel identification, content identification, and/or playback position information. Mobile device application 315 may store this information locally in mobile device 310.

At 540, media device 306A may enter a sleep mode, power off, or power down. For example, upon transferring the playback position to mobile device application 315, media device 306A may enter a standby mode or a powered off mode to conserve power. The transfer of the playback information may indicate that media device 306A is to no longer stream the content.

At 550, mobile device application 315 may transmit the media playback state information to media device 306B. In some embodiments, mobile device application 315 may also transmit a wake command to media device 306B. This wake command may power on media device 306B and/or corresponding display device 308B. Media device 306B may also use the media playback state information to retrieve the content previously played and load the content at the particular playback position. For example, media device 306B may use the channel identification to identify the particular content provider. This channel identification may specify an address and/or identification for a content server to retrieve the content. For example, the channel identification may specify a third party content provider. Media device 306B may also use a content identification to identify the particular content to retrieve. This content identification may identify content provided by the content provider specified by the channel identification. In some embodiments, media device 306B may be able to use the content identification to identify the content and/or the content provider without using the channel identification.

Upon identifying the content that was previously played on media device 306A, media device 306B may use the playback position information to begin playing the content on media device 306B at the specified position. The playback position information may be a timestamp and/or an indication of a timing position to begin playback. The playback position information may include a timing for an audio and/or video component corresponding to the content. For example, media device 306B may load the particular content using the channel identification and/or the content identification. Media device 306B may then skip to the playback position indicated by media device 306A using the provided timing information. In this manner, media device 306B may resume playback at the specified timing.

FIG. 6 illustrates a flowchart depicting a method 600 for transferring media playback from a first media device 306A to a second media device 306B via a mobile device application 315, according to some embodiments. Method 600 shall be described with reference to FIG. 1, FIG. 2, FIG. 3B, and FIG. 5: however, method 600 is not limited to that example embodiment.

Method 600 may provide a process for transferring playback by downloading media playback state information to a mobile device 310. Mobile device application 315 may be installed on mobile device 310. While method 600 is described with reference to mobile device application 315, method 600 may be executed on any computing device, such as, for example, the computer system described with reference to FIG. 7 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6, as will be understood by a person of ordinary skill in the art.

At 610, mobile device application 315 on mobile device 310 may transmit to first media device 306A a command to transfer playback of media from the first media device 306A to a second media device 306B. As explained with reference to FIG. 3B and FIG. 5, this selection may be performed via a graphical user interface menu selection and/or a verbal command. Upon receiving this command, first media device 306A may package media playback state information to download onto mobile device application 315. This media playback state information may include a channel identification, a content identification, and/or a playback position. The playback position may be a timestamp or an indication of a time corresponding to when the mobile device application 315 transmitted the command to transfer playback.

At 620, the mobile device application 315 on mobile device 310 may receive from the first media device 306A the media playback state information indicating a playback position to resume playback of the media on the second media device 306B. First media device 306A may download the media playback state information onto mobile device 310 as described with reference to FIG. 3B and FIG. 5. Mobile device 310 may store this information in local memory. Mobile device application 315 may also display this information indicating that it has been stored on mobile device 310. In some embodiments, mobile device application 315 may display a confirmation when the media playback state information has been stored.

At 630, mobile device application 315 may transmit to the second media device 306B the media playback state information to resume playback of the media at the playback position on the second media device 306B. This transmission may occur in a manner similar to the transmission described with reference to FIG. 3B and FIG. 5. In some embodiments, mobile device application 315 may generate a graphical user interface with a prompt asking the user to identify the second media device 306B. This prompt may include a menu listing the media devices 306 associated with a network common to the first media device 306A and/or the mobile device 310. Upon selection of the second media device 306B, mobile device application 315 may transmit the media playback state information.

For example, mobile device application 315 may transmit the channel identification, content identification, and/or the playback position to the second media device 306B. This may occur via a network shared by the mobile device 310 and the second media device 306B. In some embodiments, mobile device 310 and second media device 306B may communicate via a wireless communication protocol. Mobile device 310 may then transmit a message with the media playback state information to the second media device 306B to resume playback. The second media device 306B may then use this information to identify the particular content and resume playback at the provided playback position.

Example Computer System

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718.

Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for transferring playback of streaming media, compri sing:
receiving, by at least one computer processor at a second media device, a command transmitted by a first media device indicating transfer of media playback from the first media device to the second media device;
receiving, at the second media device and from the first media device, media playback state information indicating a playback position of media streaming on the first media device;
detecting, at the second media device, a user interaction with a remote control device paired with the second media device;
in response to the detecting, resuming streaming of the media on the second media device at the playback position according to the media playback state information; and
transmitting, from the second media device to the first media device, a command to power off a display device coupled to the first media device.

2. The computer-implemented method of claim 1, wherein the command transmitted by the first media device indicating the transfer of media playback is received at the second media device via a WiFi router.

3. The computer-implemented method of claim 1, wherein the command transmitted by the first media device indicating the transfer of media playback is received at the second media device via a server residing in a geographic location that differs from the first media device and the second media device.

4. The computer-implemented method of claim 1, wherein the command transmitted by, the first media device indicating the transfer of media playback is received at the second media device as a broadcast message transmitted from the first media device to a plurality of media devices.

5. The computer-implemented method of claim 1, wherein the media playback state information includes a channel identification corresponding to a content provider.

6. The computer-implemented method of claim 1, where- inthe resuming the streaming of the media comprises:
accessing a content server via an API command using the media playback state information.

7. The computer-implemented method of claim 1, wherein the detecting the user interaction with the remote control device comprises:
receiving, at the second media device, a power on command from the remote control device generated in response to an accelerometer or gyroscope sensor signal generated at the remote control device.

8. A second media device, comprising:
one or more memories; and
at least one processor each coupled to at least one of the memories and configured to perform operations comprising:
establishing a paired connection with a remote controldevice;
receiving a command transmitted by a first media device indicating transfer of media playback from the first media device to the second media device;
receiving, from the first media device, media playback state information indicating a playback position of media streaming on the first media device;
detecting a user interaction with the remote control device;
in response to the detecting, resuming streaming of the media at the playback position according to the media playback state information; and
transmitting, to the first media device, a command to power off a display device coupled to the first media device.

9. The second media device of claim 8, wherein the command transmitted by the first media device indicating the transfer of media playback is received at the second media device via a WiFi router.

10. The second media device of claim 8, wherein the command transmitted by the first media device indicating the transfer of media playback is received at the second media device via a server residing in a geographic location that differs from the first media device and the second media device.

11. The second media device of claim 8, wherein the command transmitted by the first media device indicating the transfer of media playback is received at the second media device as a broadcast message transmitted from the first media device to a plurality of media devices.

12. The second media device of claim 8, wherein the media playback state information includes a channel identification corresponding to a content provider.

13. The second media device of claim 8, wherein the resuming the streaming of the media comprises:
accessing a content server via an API command using the media playback state information.

14. The second media device of claim 8, wherein the detecting the user interaction with the remote control device comprises:
receiving a power on command from the remote control device generated in response to an accelerometer or gyroscope sensor signal generated at the remote control device.

15. A non-transitory computer-readable medium having instructions stored thereon that, when executed by at least one computing device, cause the at least one computing device to perform operations comprising:
receiving, at the at least one computing device, a command transmitted by a media device indicating transfer of media playback from the media device to the at least one computing device;
receiving, at the at least one computing device and from the media device, media playback state information indicating a playback position of media streaming on the media device;
detecting, at the at least one computing device, a user interaction with a remote control device paired with the at least one computing device;
in response to the detecting, resuming streaming of the media on the at least one computing device at the playback position according to the media playback state information; and transmitting, from the at least one computing device to the media device, a command to power off a display device coupled to the media device.

16. The non-transitory computer readable medium of claim 15, wherein the command transmitted by the media device indicating the transfer of media playback is received at the at least one computing device via a WiFi router.

17. The non-transitory computer readable medium of claim 15, wherein the command transmitted by the media device indicating the transfer of media playback is received at the at least one computing device via a server residing in a geographic location that differs from the media device and the at least one computing device.

18. The non-transitory computer readable medium of claim 15, wherein the command transmitted by the media device indicating the transfer of media playback is received at the at least one computing device as a broadcast message transmitted from the media device to a plurality of media devices.

19. The non-transitory computer readable medium of claim 15, wherein the resuming the streaming of the media comprises:
    accessing a content server via an API command using the media playback state information.

20. The non-transitory computer readable medium of claim 15, wherein the detecting the user interaction with the remote control device comprises:
    receiving, at the at least one computing device, a power on command from the remote control device generated in response to an accelerometer or gyroscope sensor signal generated at the remote control device.

* * * * *